United States Patent
Yu et al.

(10) Patent No.: US 9,860,013 B2
(45) Date of Patent: Jan. 2, 2018

(54) TIME DIVISION MULTIPLEXED ORBITAL ANGULAR MOMENTUM BASED COMMUNICATION

(71) Applicant: ZTE Corporation, Shenzhen (CN)

(72) Inventors: Jianjun Yu, Basking Ridge, NJ (US); Yuan Fang, Morristown, NJ (US)

(73) Assignee: ZTE Corporation, Shenzhen (CN)

(*) Notice: Subject to any disclaimer, the term of this patent is extended or adjusted under 35 U.S.C. 154(b) by 53 days.

(21) Appl. No.: 14/995,107

(22) Filed: Jan. 13, 2016

(65) Prior Publication Data
US 2016/0204896 A1 Jul. 14, 2016

Related U.S. Application Data

(60) Provisional application No. 62/103,523, filed on Jan. 14, 2015.

(51) Int. Cl.
| | |
|---|---|
| H04J 14/06 | (2006.01) |
| H04J 14/08 | (2006.01) |
| H04B 10/11 | (2013.01) |
| H04B 10/272 | (2013.01) |
| H04J 14/02 | (2006.01) |
| H04J 14/04 | (2006.01) |

(52) U.S. Cl.
CPC .......... *H04J 14/086* (2013.01); *H04B 10/11* (2013.01); *H04B 10/272* (2013.01); *H04J 14/0282* (2013.01); *H04J 14/04* (2013.01)

(58) Field of Classification Search
CPC ...... H04J 14/086; H04J 14/04; H04J 14/0282; H04B 10/272; H04B 10/11

USPC .......................................................... 398/65
See application file for complete search history.

(56) References Cited

U.S. PATENT DOCUMENTS

| | | | | |
|---|---|---|---|---|
| 9,077,577 | B1 | 7/2015 | Ashrafi et al. | |
| 2010/0265922 | A1* | 10/2010 | Bracha | H04W 74/0808 370/336 |
| 2012/0263466 | A1* | 10/2012 | Djordjevic | H04L 27/2096 398/65 |
| 2013/0148963 | A1 | 6/2013 | Cvijetic et al. | |
| 2015/0104139 | A1 | 4/2015 | Brunet et al. | |
| 2015/0146815 | A1 | 5/2015 | Berretta et al. | |
| 2015/0333865 | A1 | 11/2015 | Yu et al. | |
| 2015/0349910 | A1* | 12/2015 | Huang | H04J 14/00 398/44 |
| 2016/0212510 | A1 | 7/2016 | Bogoni et al. | |

(Continued)

OTHER PUBLICATIONS

Tucker, "Optical Time-Division Multiplexing for Very High Bit-Rate Transmission", IEEE 1988.*

(Continued)

*Primary Examiner* — Juan A Torres
(74) *Attorney, Agent, or Firm* — Perkins Coie LLP

(57) ABSTRACT

Optical signals with different orbital angular momentum (OAM) modes are used to multiplex data directed to different receiver together using time division multiplexing. The OAM based multiplexing may be used in addition to other multiplexing schemes such as time division multiplexing, polarization multiplexing and so on. Capacity of existing optical network infrastructure can be increased significantly using OAM modulation, and data communication can be secured at the same time.

23 Claims, 12 Drawing Sheets

(56) References Cited

U.S. PATENT DOCUMENTS

2016/0254897 A1 9/2016 Berretta et al.

OTHER PUBLICATIONS

Allen, L., et al., "Orbital angular-momentum of light and the transformation of Laguerre-Gaussian laser modes," Physical Review A, 45(11):8185-8189, Jun. 1992.

Djordjevic, I.B., et al., "Error-Correction Coded Orbital-Angular-Momentum Modulation for FSO Channels Affected by Turbulence," Journal of Lightwave Technology, 30(17):2846-2852, Sep. 2012.

Dong, Z., et al., "Ultra-dense WDM-PON delivering carrier-centralized Nyquist-WDM uplink with digital coherent detection," Optics Express, 19(12):11100-11105, Jun. 2011.

Fang, Y., et al., "A Novel PON Architecture Based on OAM Multiplexing for Efficient Bandwidth Utilization," IEEE Photonics Journal, 7(1):7900506(1-6), Feb. 2015.

Fang, Y., et al., "Ultrahigh-capacity access network architecture for mobile data backhaul using integrated W-band wireless and free-space optical links with OAM multiplexing," Optics Letters, 39(14):4168-4171, Jul. 2014.

Gibson, G., et al., "Free-space information transfer using light beams carrying orbital angular momentum," Optics Express, 12(22):5448-5456, Nov. 2004.

Huang, H., et al., "100 Tbit/s free-space data link enabled by three-dimensional multiplexing of orbital angular momentum, polarization, and wavelength," Optics Letters, 39(2):197-200, Jan. 2014.

Huang, H., et al., "100 Tbit/s Free-Space Data Link using Orbital Angular Momentum Mode Division Multiplexing Combined with Wavelength Division Multiplexing," Optical Fiber Communication Conference, paper OTh4G.5, pp. 1-3, Anaheim, California, USA, Mar. 2013.

Jack, B., et al., "Angular Diffraction," New Journal of Physics, 10(103013):1-8, Oct. 2008.

Karimi, E., et al., "Time-division multiplexing of the orbital angular momentum of light," Optics Letters, 37(2):127-129, Jan. 2012.

Wang, J., et al., "25.6-bit/s/Hz Spectral Efficiency using 16-QAM Signals over Pol-Muxed Multiple Orbital-Angular-Momentum Modes," IEEE Photonics Conference (PHO), pp. 587-588, Arlington, Virginia, USA, Oct. 2011.

Wang, J., et al., "Demonstration of 12.8-bids/Hz Spectral Efficiency using 16-QAM Signals over Multiple Orbital-Angular-Momentum Modes," 37th European Conference and Exhibition on Optical Communication (ECOC 2011), We.10.P1.76, pp. 1-3, Geneva, Switzerland, Jul. 2011.

Wang, J., et al., "N-Dimentional Multiplexing Link with 1.036-Pbit/s Transmission Capacity and 112.6-bit/s/Hz Spectral Efficiency using OFDM-8QAM Signals over 368 WDM Pol-Muxed 26 OAM Modes," 2014 European Conference on Optical Communication (ECOC 2014), Paper Mo.4.5.1, pp. 1-3, Cannes, France, Sep. 2014.

Wang, J., et al., "Terabit free-space data transmission employing orbital angular momentum multiplexing," Nature Photonics, 6(7):488-496, Jun. 2012.

Willner, A.E., "Invited Paper: Orbital Angular Momentum Transmission," 39th European Conference and Exhibition on Optical Communication (ECOC 2013), Mo.4.A.1, pp. 1-3, London, England, Sep. 2013.

Yan, Y., et al., "Multicasting in a spatial division multiplexing system based on optical orbital angular momentum," Optics Letters, 38(19):3930-3933, Oct. 2013.

Yu, J., et al., "Cost-Effective Optical Millimeter Technologies and Field Demonstrations for Very High Throughput Wireless-Over-Fiber Access Systems," Journal of Lightwave Technology, 28(16):2376-2397, Aug. 2010.

Yue, Y., et al., "1.6-Tbit/s Muxing, Transmission and Demuxing through 1.1-km of Vortex Fiber Carrying 2 OAM Beams Each with 10 Wavelength Channels," Optical Fiber Communication Conference/National Fiber Optic Engineers Conference 2013, OSA Technical Digest (online) (Optical Society of America), Paper OTh4G.2, pp. 1-3, Anaheim, California, USA, Mar. 2013.

\* cited by examiner

TIME DIVISION MULTIPLEXED ORBITAL ANGULAR MOMENTUM BASED COMMUNICATION

CROSS REFERENCE TO RELATED APPLICATIONS

This patent document claims the benefit of priority of U.S. Provisional Patent Application No. 62/103,523, filed on Jan. 14, 2015. The entire content of the before-mentioned patent application is incorporated by reference as part of the disclosure of this document.

BACKGROUND

This patent document relates to digital communication, and, in one aspect, optical communication systems.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which transmission bandwidth can be increased while operational and capital expenditure can be reduced.

SUMMARY

The present document discloses, among other things, a passive optical network (PON) access architecture that uses orbital angular momentum (OAM) multiplexing. We propose and experimentally demonstrate time division multiplexed orbital angular momentum (OAM) access system to increase transmission capacity and spectral efficiency. In this system, data carried on different time tributaries share the same OAM mode. Multiple time division multiplexed OAM modes are multiplexed to realize two-dimensional (time dimension and OAM dimension) multiplexing. Therefore, the capacity and spectral efficiency of the access system will increase. The orthogonality between optical time division multiplexing (OTDM) and OAM techniques is also verified in our experiment. In proof-of-concept experiment, 2×5-Gbps return-to-zero (RZ) signal over OAM mode +4 is transmitted and investigated. The BER performance after transmission in this system can be smaller than $1 \times 10^{-9}$. Results show that the proposed time division multiplexed orbital angular momentum access system is suitable for future broadband access network.

In one example aspect, a method of optical communication implemented at a network-side equipment in an optical communication network is disclosed. The method includes receiving multiple data streams directed to multiple receivers, multiplexing, in time domain, the multiple data streams such that at least some of the multiple data streams are transmitted in different time slots, performing, for data streams transmitted in a same time slot, orbital angular momentum (OAM) multiplexing, and transmitting, signal resulting from the multiplexing in time domain and OAM multiplexing, over a fiber optic medium.

In another example aspect, an optical communication apparatus is disclosed. The apparatus includes a module that multiplexes, for each time slot in a time division multiplex of data, multiple data streams directed to multiple destinations, by using a different orbital angular momentum (OAM) mode for each destination, and a module that transmits, signal resulting from the multiplexing, over a fiber optic medium.

In yet another example aspect, a method of optical communication implemented at an optical receiver is disclosed. The method includes receiving an optical signal multiplex comprising multiple data streams multiplexed using time division multiplexing (TDM) and within each time slot of the TDM, multiplexed using different optical angular momentum (OAM) modes, receiving modulation information about an incoming time slot and an incoming OAM mode, and recovering, from the received optical signal multiplex, and using the modulation information, a data stream targeted for the optical receiver.

In yet another aspect, an optical receiver apparatus is disclosed. The apparatus includes a front end that receives an optical signal multiplex comprising multiple data streams multiplexed using time division multiplexing (TDM) and within each time slot of the TDM, multiplexed using different optical angular momentum (OAM) modes, a processor that receives modulation information about an incoming time slot and an incoming OAM mode, and a module that recovers, from the received optical signal multiplex, and using the modulation information, a data stream targeted for the optical receiver.

In yet another aspect, an optical communication network is disclosed. The network includes an optical transmitter that creates an optical signal in which data signals directed to multiple different destinations are multiplexed in time domain and further multiplexed using different modes of optical angular momentum, and a plurality of optical receivers, wherein each optical receiver corresponds to a destination and receive the optical signal and extracts data signal directed to itself based on information received from the optical transmitted identified a time slot location and an optical angular momentum mode where the data signal directed to that optical receiver can be located.

These and other aspects, and their implementations and variations are set forth in the drawings, the description and the claims.

DETAILED DESCRIPTION

Considering the ever-increasing demand for high bandwidth data networks, stimulated by emerging internet services in optical access network, it is becoming important to be able to deliver more data within available bandwidth. To ensure the efficient utilization of bandwidth resources, researchers have studied and developed high baud rate signal transmission, advanced modulation formats, multiplexing methods, etc. that increase spectral efficiency measured in terms of the number of bits that can be transmitted per Hertz of bandwidth per second.

Recently, orbital angular momentum (OAM) multiplexing, which holds the promise of providing ultra-high spectral efficiency and capacity, has drawn much research interest. A Laguerre-Gaussian (LG) beam is found to have a well-defined OAM and OAM was introduced to optical communication system. OAM multiplexing features the transparency to modulation format and signal data rate. Another advantage of OAM multiplexing technique is its compatibility with existing multiplexing techniques such as time division multiplexing (TDM), wavelength division multiplexing (WDM), spatial division multiplexing (SDM) and mode division multiplexing (MDM). In fact, OAM provides additional dimension for multiplexing with theoretically infinite number of orthogonal eigen-states. As disclosed herein, OAM can be combined with existing multiplexing techniques to further increase capacity and spectral efficiency.

The present document provides, among other techniques, a novel access system based on time division multiplexed OAM to increase capacity and spectral efficiency. Multiple time division multiplexed OAM modes are multiplexed to realize two-dimensional (time dimension and OAM dimension) multiplexing. Every OAM mode can be shared with different time tributaries by more users. Therefore, the capacity and spectral efficiency of access network will increase. We also verify the orthogonality between optical time division multiplexing (OTDM) and OAM techniques in experiment. In proof-of-concept experiment, we multiplex two 5-Gbps return-to-zero (RZ) signals carried over OAM mode +4 in time domain. The bit-error-ratio (BER) performance after transmission in this system can be smaller than $1 \times 10^{-9}$.

Figure 7:
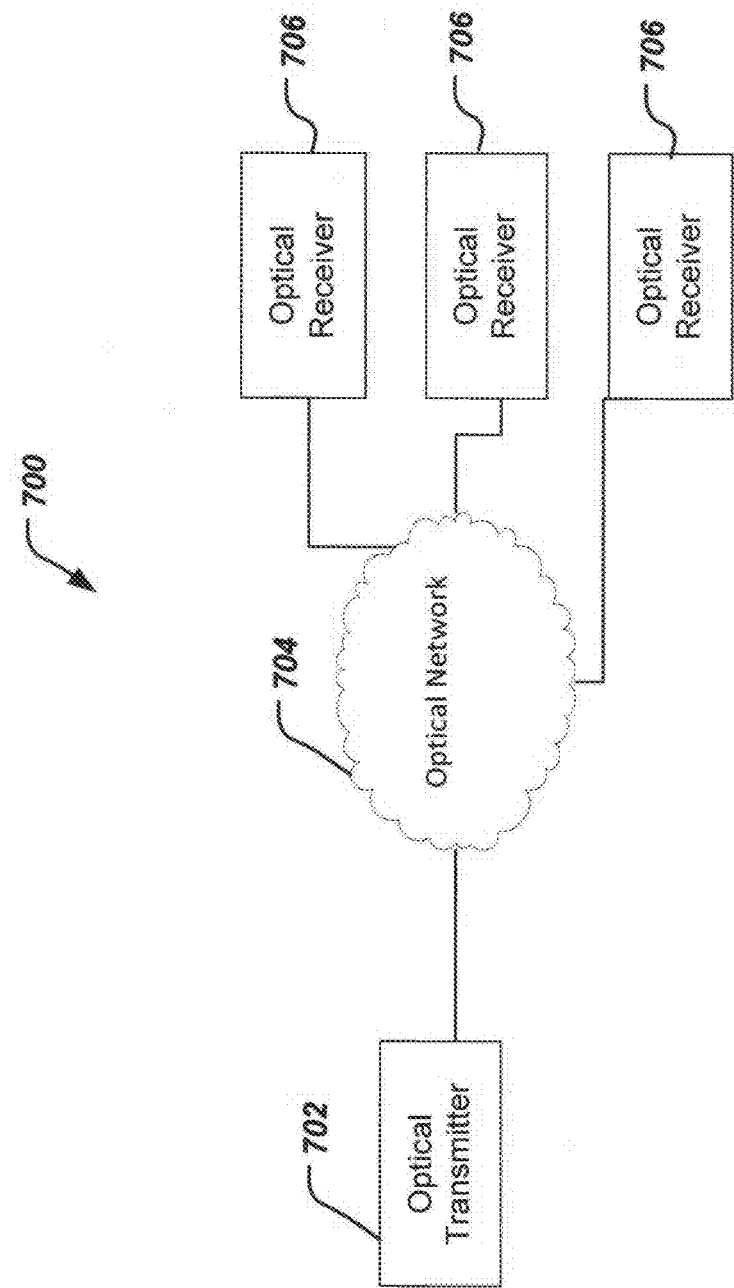
FIG. 7 shows an example optical network.

FIG. 7 depicts an optical communication system 700 in which the presently disclosed technology can be practiced. One or more optical transmitters 702 are communicatively coupled via an optical network 704 with one or more optical receivers 706. The optical network 704 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 7 for clarity.

Figure 1:
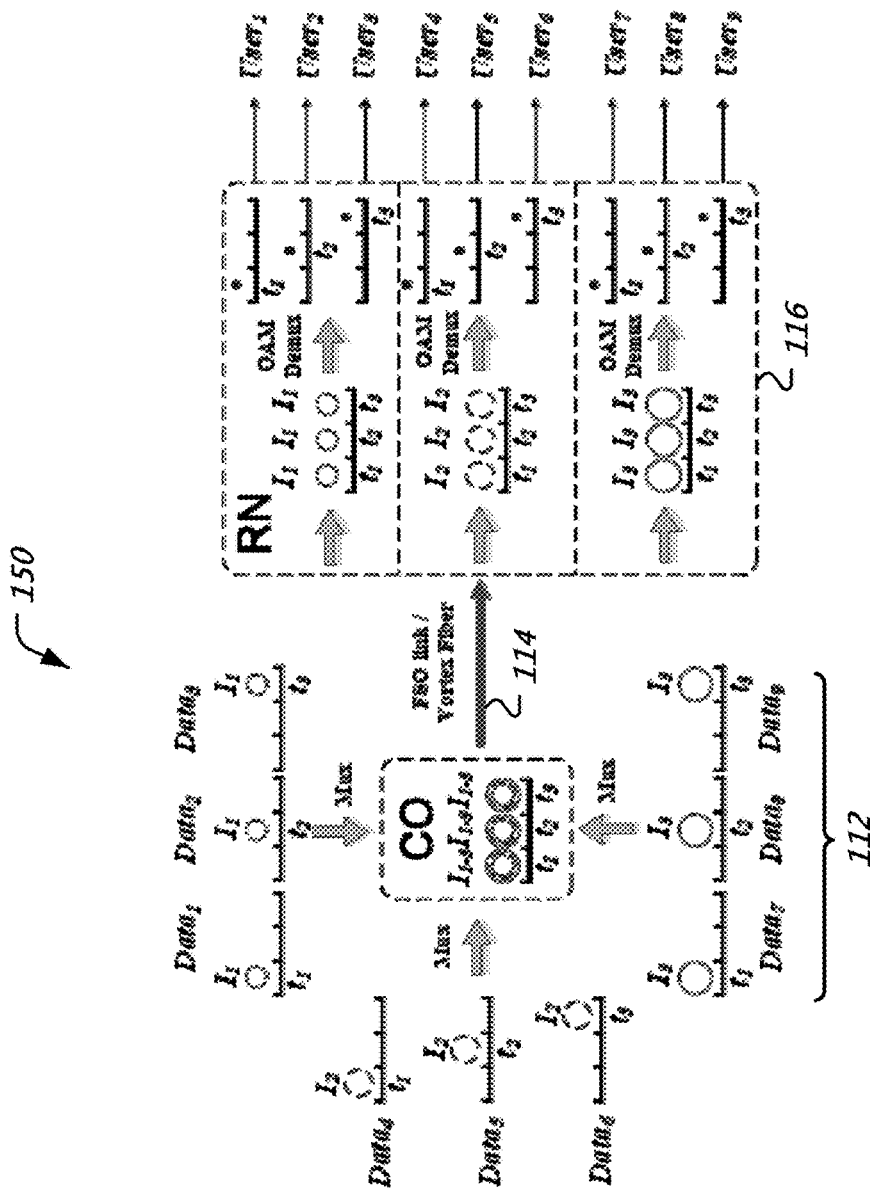
FIG. 1 depicts an example of a time division multiplexed OAM access system. CO: central office, RN: remote node.

FIG. 1 illustrates an example of an optical access system 150 which increases capacity based on time division multiplexed OAM. For illustration, the system 150 depicts an embodiment with 3 OAM modes and 3 time tributaries as example. The access system 150 is made up of central office (CO) 112, remote node (RN) 116 and end users. In CO, RZ signals in different time tributaries are generated separately and then converted from Gaussian beam to LG beam with the same OAM mode independently to realize OAM generation. For the same OAM mode, when one data stream (i.e. data 1) carried on one OAM mode (i.e. $OAM_{11}$) possesses one time tributary (i.e. t1), the same OAM may be absent in other two tributaries (e.g., t2 & t3). Therefore, three relatively delayed LG beams with the same OAM mode will appear alternatively in time domain at the same spatial position. In other words, there will be almost no optical power at the time interval between RZ signals for every tributary. By combining these three LG beams, the time division multiplexed OAM mode can be realized. After that, different OAM modes can still be multiplexed because of the orthogonality between TDM technique and OAM multiplexing technique. After OAM multiplexing, two-dimensional multiplexing signal (time dimension and OAM mode dimension) is generated. In general, the information carried on every time tributary of every OAM mode can be different. The time division multiplexed OAM beam is transmitted over a suitable transmission medium, e.g., in free space optics (FSO) link or a vortex fiber.

The LG beam with OAM has unique helical phasefront. This attribute can be expressed by an azimuthal phase term $e^{(il\varphi)}$. Here the value l is the topological charge which indicates the specific OAM modes and $\varphi$ is the azimuthal phase. The orbital angular momentum is lh per photon where l must be an integer (l=0, ±1, ±2 . . . ). The generation and detection of OAM modes are realized by employing reflective spatial light modulator (SLM) with pre-calculated hologram pattern. Gaussian beam with l=0 signal can be converted to OAM mode for multiplexing and vice versa.

Multi-channel signals are converted from fundamental Gaussian beam to LG beam with various OAM modes. Benefiting from the orthogonality of OAM modes, signal carried by different OAM modes will not interfere with each other. Meanwhile, multiplexing signals in the dimension of OAM significantly improves spectral efficiency thus enables efficient bandwidth utilization. Moreover, OAM multiplexing provide additional security performance, since one will not be able to demux the OAM mode unless know the topological charge in advance. After FSO transmission, OAM demultiplexing is done in remote node. Every OAM mode can be demultiplexed and detected independently by converting LG beam back to fundamental Gaussian beam while keeping other modes still in OAM mode. The converted beam is coupled into fiber again and sent to receiver in optical network unit (ONU). It should be noted that the architecture we proposed is flexible and adaptive to various applications. OAM modes can be utilized to carry different services for multicasting and demultiplexing can also be done at ONU.

Figure 12:
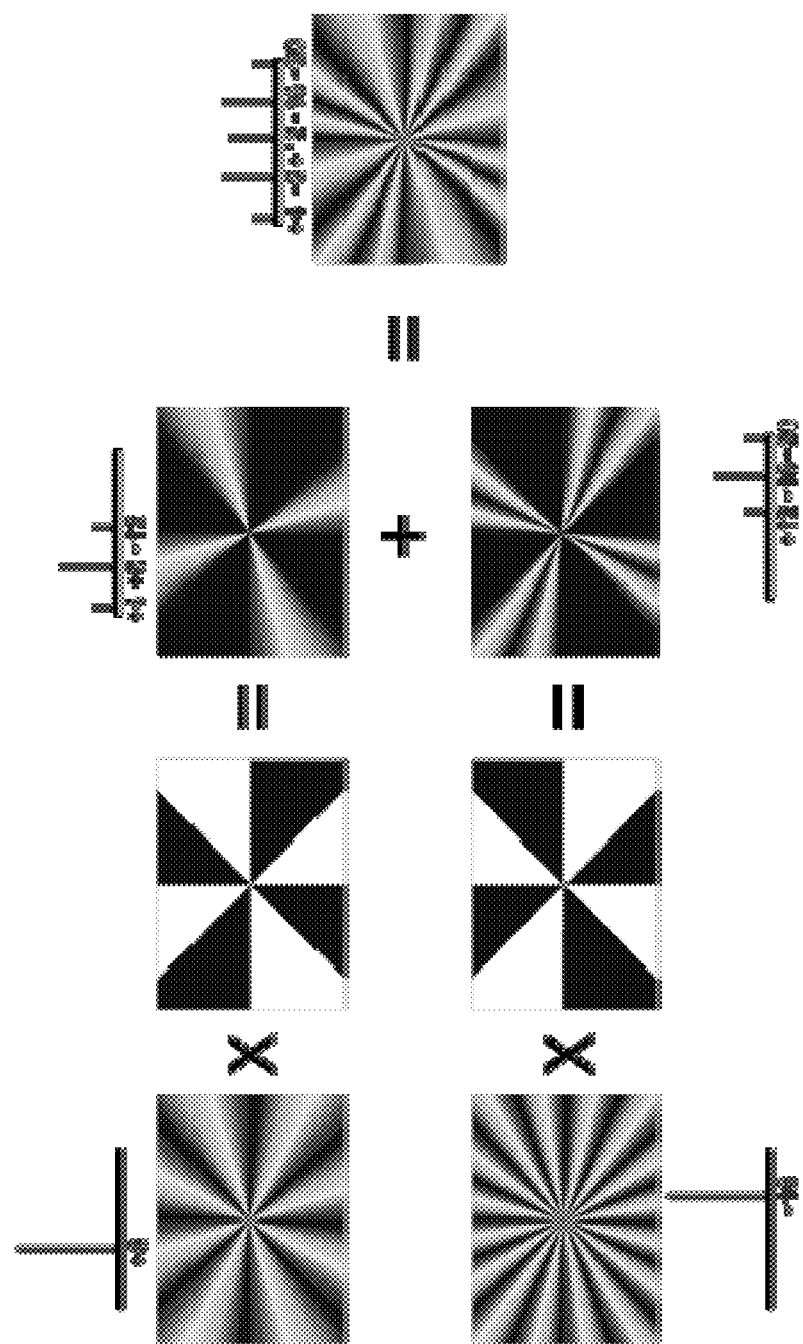
FIG. 12 depicts examples of multiple OAM modes generated based on sliced phase patterns and angular masks.

Multiple OAM modes can be generated in various ways: a specially designed hologram pattern implemented to SLM, odd times reflection, polarization multiplexing in free space and so on. FIG. 12 shows an example process of designing hologram pattern to generate OAM mode +4, +8, +12, +16 and +20 by one SLM simultaneously. A hologram pattern of +8 and angular mask with 4-fold rotational symmetry can be generated first. Because of the angular diffraction principle, N-fold rotational symmetry angular mask will distribute energy from OAM mode 1 to 1+N and 1−N. Therefore, part of the power on +8 will transfer to +4 and +12. In this way, this hologram pattern generates 3 OAM modes: +4, +8 and +12. Meanwhile, a similar rotational symmetry principle can be used to generate +12, +16 and +20. By superimposition of two hologram patterns, a sliced phase pattern to generate 5 modes is obtained. The angular masks for the two holograms can be designed to be complementary to each other, which minimizes the interference between different modes. Benefiting from the mirror image relationship of reflected LG beam with OAM mode, odd-time reflection can be utilized to generate the OAM modes with opposite charge sign. In this way, 10 OAM modes can be generated with only one SLM, two beam splitters and three mirrors.

In RN, OAM demultiplexing is implemented to separate different OAM modes and convert the LG beam back to fundamental Gaussian beam. However, each Gaussian beam still contains time division multiplexed RZ signals. The following TDM demultiplexing is necessary to extract different tributaries. Finally, data carried on different tributaries of different OAM modes are distributed to different end users. The additional degree of freedom (DOF) in time domain tributary to carry data will significantly increase the capacity and spectral efficiency of the access network, e.g., by allowing simultaneous carriage of data for multiple users or multiple destination receivers.

Figure 2:
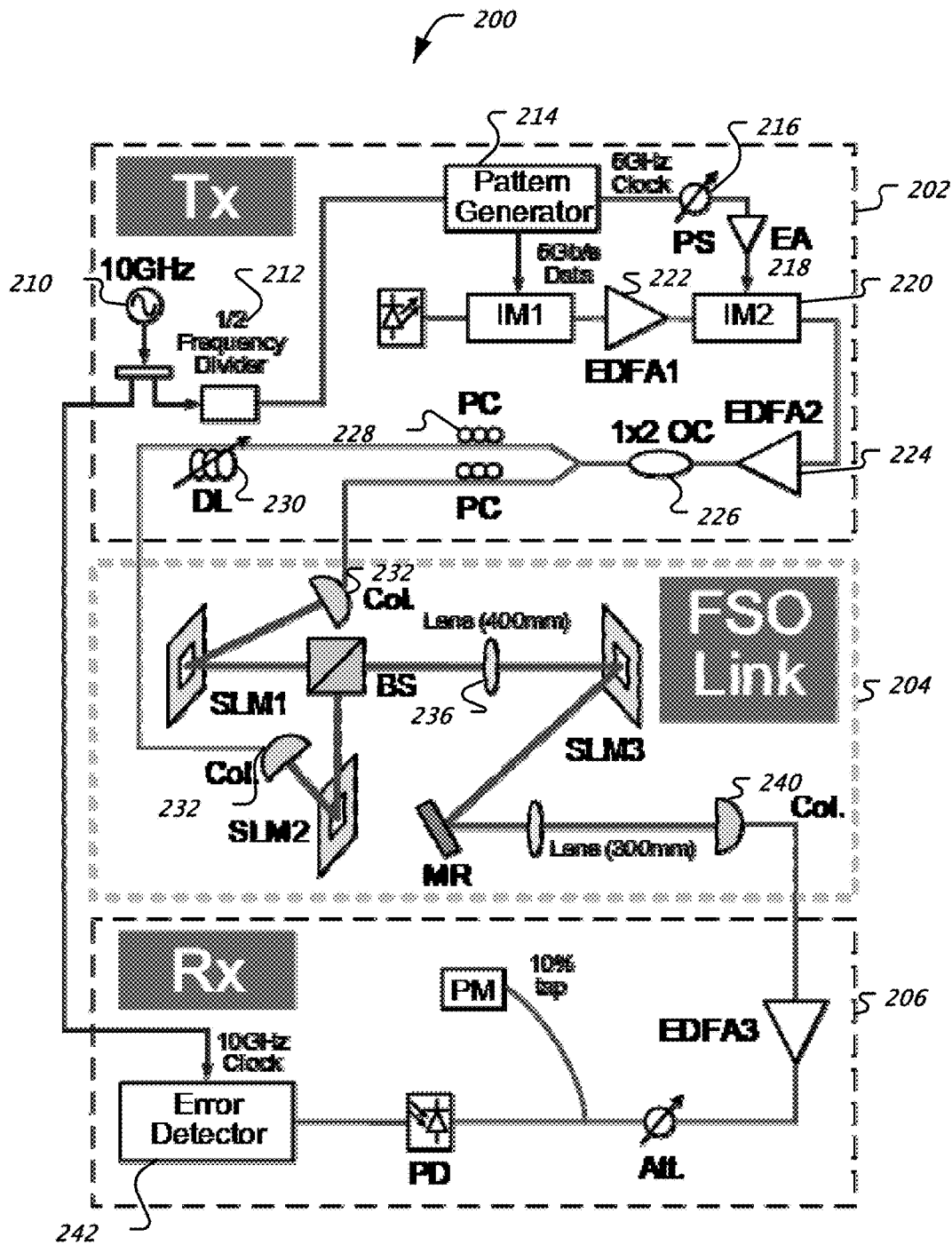
FIG. 2 shows an example setup of time division multiplexed OAM access system. Tx: transmitter, Rx: receiver, IM: intensity modulator, EDFA: Erbium-doped fiber amplifier, EA: electrical amplifier, PS: phase shifter, OC: optical coupler, DL: delay line, PC: polarization controller, SLM: spatial light modulator, Col.: collimator, BS: beam splitter, MR: mirror, Att.: attenuator, PM: power meter, PD: photodiode.

One example setup of an access system 200 based on time division multiplexed OAM is shown in FIG. 2. To simplify the discussion, the access system 200 uses two time tributaries and 1 OAM mode case. In transmitter 202, a microwave source 210 with 10-GHz output is employed. One frequency divider 212 is used to generate a 5-GHz clock for the pattern generator 214. Then, the 5-Gbaud electrical binary signal with a pattern length of $2^7-1$ is modulated onto the optical carrier from an external cavity laser (ECL) to generate 5-Gbps optical non-return-to-zero (NRZ) signal by intensity modulator (IM1). One Erbium-doped fiber amplifier (EDFA1, 222) is employed to compensate for the insertion loss of IM1. Then a following IM2 220 is employed as a pulse carver to covert NRZ signal to RZ signal for OTDM. The clock for IM2 220 is identical to that for the pattern generator (5 GHz). An electrical amplifier (EA) 218 is used to amplify the radio-frequency (RF) driving voltage and a phase shifter (PS) 216 is used to better shape the waveform of RZ signal. The modulator is biased at the maximum transmission point to realize the 33% RF signal. EDFA2 224 is used to provide sufficient optical power up to 22 dBm. The optical RZ signal is split into two branches via one 1×2 optical coupler (OC) 226. In both branches connected to SLM1 and SLM2, a polarization controller 228 is used to adjust the polarization since the incident light must be horizontally polarized to ensure good performance of the reflective SLM1 and SLM2. In the branch connected to SLM2, we an optical delay line (DL) 230 is provided to introduce delay between two branches. After the DL 230, the information carried by the two beams incident onto SLM1 and SLM2 at any given instant in time will in general be different. By adjusting the DL 230, the access system 200 can ensure the RZ signals from two branches to interleave with each other and OTDM is realized.

The optical signal with Gaussian beam is incident on a liquid-crystal on silicon spatial light modulator (LCOS-SLM, HAMAMATSU, 792×600 pixels) with high-precision phase modulation characteristics. With collimators 232, the optical signal is coupled from fiber to FSO link 204. Utilizing specially designed hologram pattern, such as shown in FIG. 12, fundamental Gaussian beam is converted to LG beam with OAM mode +4 on both SLM1 and SLM2, respectively. Two LG beams, interleaved with each other in time domain, are then combined by a beam splitter (BS) to realize OTDM for the same OAM mode. The OTDM technique enables two OAM beams carrying different data alternately appear in time domain. Therefore, different data streams are delivered over the same OAM mode at the same spatial position. The FSO link between BS and SLM3 is 0.5 m and may include a lens 236. The beam then goes through another collimator 240 and is coupled into fiber again. Here an infra-red charge-coupled device (IR-CCD) camera can be used for the convenience of adjustment and for observing optical profile.

In receiver 206, signal firstly goes through EDFA3 to compensate for the loss during coupling and free-space propagation. A tunable attenuator is employed to vary the received power launched to lightwave receiver and a power meter is used to measure the optical power. Then, the optical signal is injected to photodiode (PD) for direct detection. Finally, an error detector 242 is employed to measure the BER performance. It should be noted that we detect the time multiplexed 10-Gb/s RZ signal together without demultiplexing for the simplification of experimental setup. However, in this case, the pattern length will be different from that of 5-Gb/s RZ signal without OTDM. In fact, the pattern length for 5-Gbps RZ signal without OTDM is $2^7-1=127$ while the pattern length for 2×5 Gbps RZ signal with OTDM is $2\times(2^7-1)=254$. In optical networks, the error detector 242, and thus the direct fiber link between the transmitter 202 and the receiver 206, will not be present.

Figure 3:
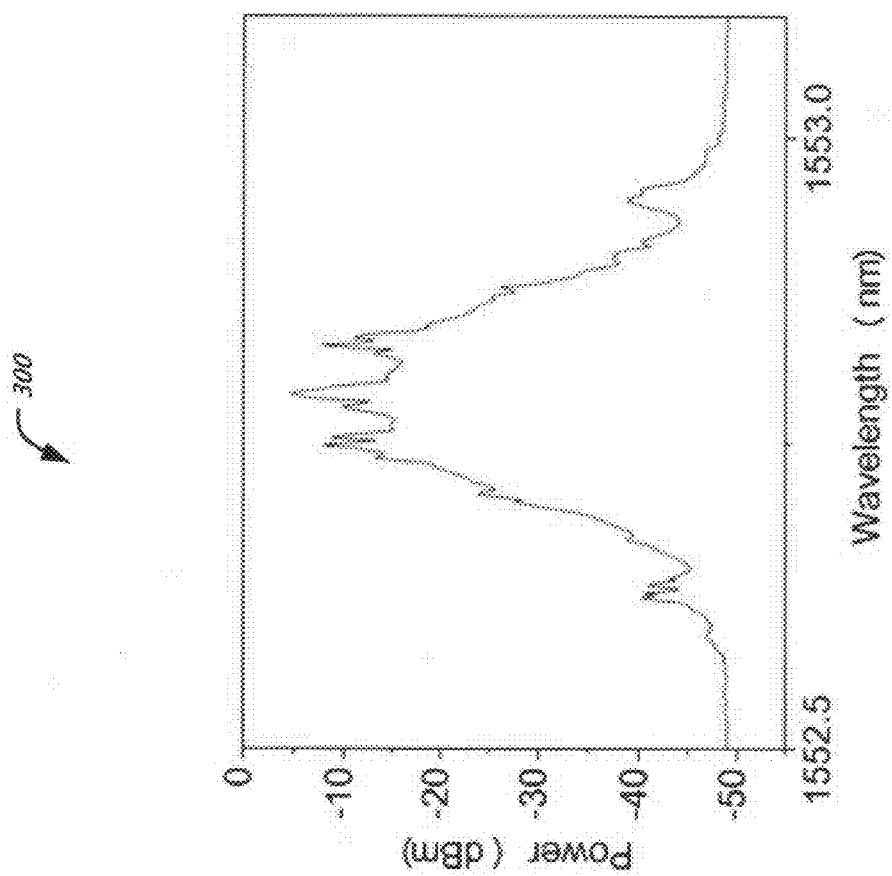
FIG. 3 is an example of an optical spectrum of RZ signal after FSO link (0.02 nm resolution).

FIG. 3 shows an example of optical spectrum 300 of the RZ signal after the FSO link. The three peaks of the spectrum of RZ signal can be clearly found. The center wavelength is located at 1552.8 nm. The modulator is biased on the maximum transmission point. The signal peaks correspond to the dc and high order frequency components related to the unipolar return-to-zero code (RZ). Even without OTDM signals, there typically will be several peaks for unipolar RZ signal. The number of peaks is related to the cycle duty of the unipolar RZ signal; more peaks with lower cycle duty and less peaks with higher cycle duty (for 100% it will be NRZ, only one peak in the middle). When using a bipolar RZ code, the spectrum will be smooth and no such peaks would be seen in the spectrum 300.

Figure 4:
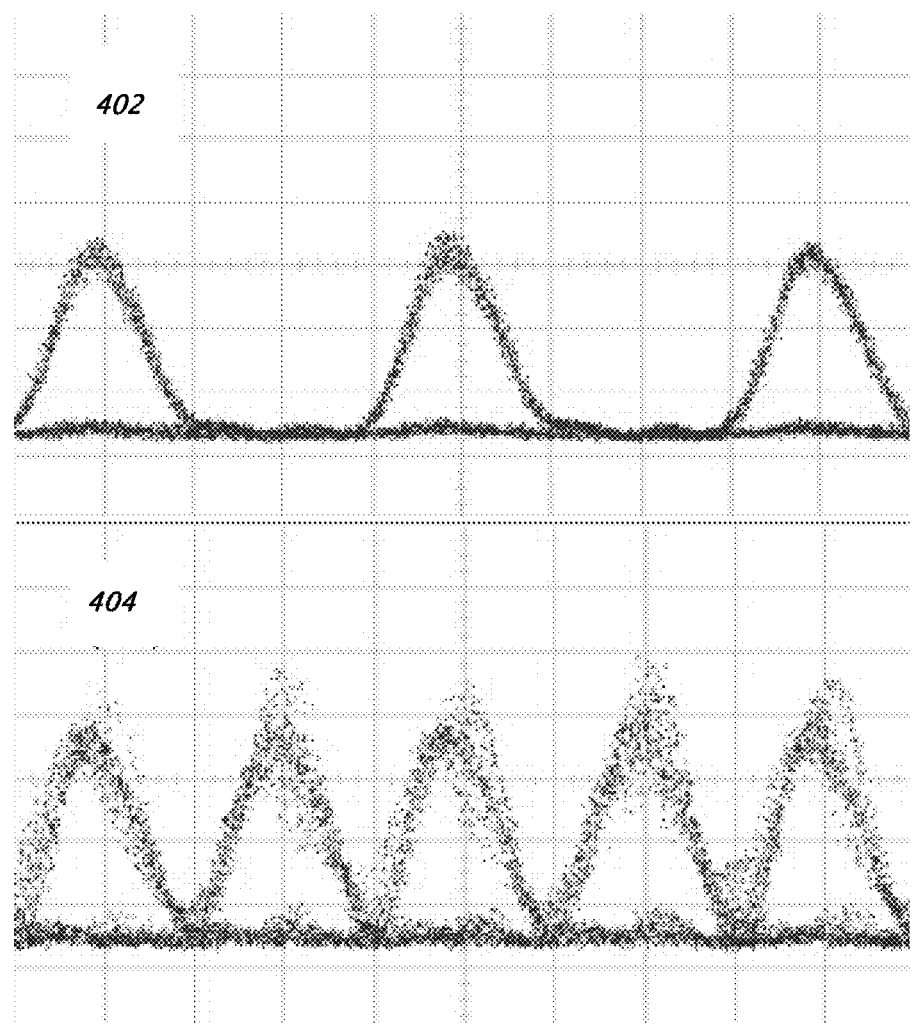
FIG. 4 shows an example time domain waveform: of 5 Gbps RZ without OTDM and 2×5 Gbps RZ with OTDM at 50 ps/div.
Figure 5:
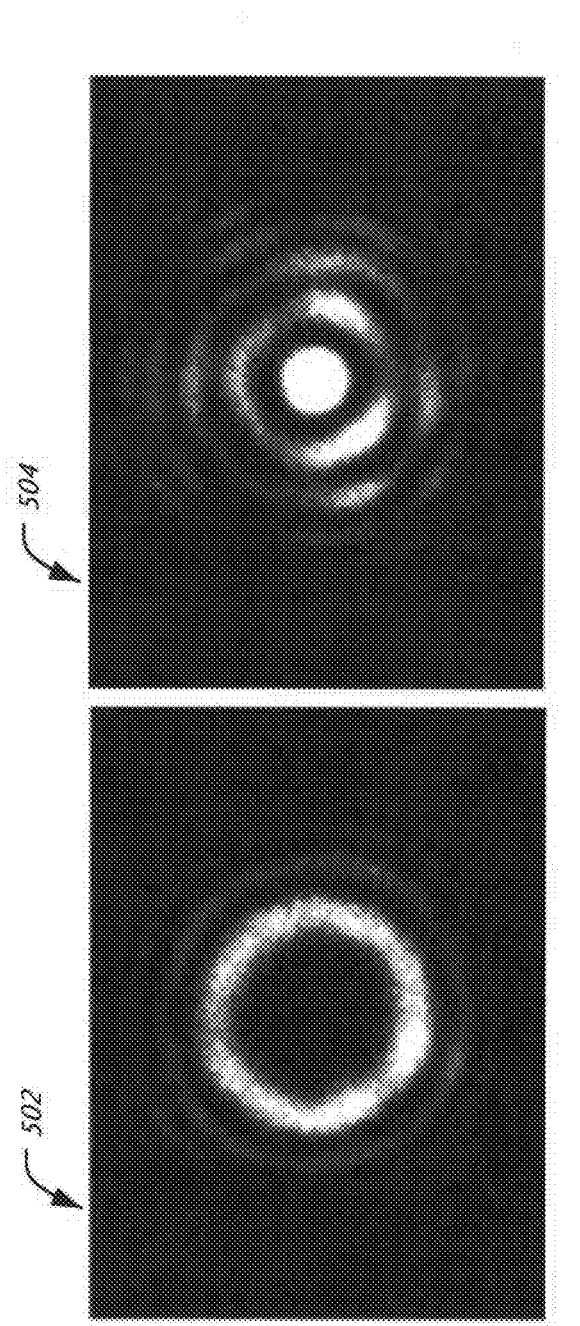
FIG. 5 shows example optical intensity profiles for generated OAM mode +4, and demultiplexed +4 mode.

FIG. 4 shows an example of a time domain eye diagram of received signal after FSO link. Graph 402 is the eye diagram of 5 Gbps RZ signal without OTDM. The time interval between RZ signals is obviously 200 ps which is 4 divisions in the scale of 50 ps/div and the extinction ratio is over 12 dB. Graph 404 shows that two data streams carried on the same OAM mode are multiplexed in time domain to realize 10-Gbps RZ signal. We add 1.1-ns delay by adjustment of the optical time delay line. After TDM, the time interval becomes 100 ps. However, the waveform has some amplitude fluctuation, which is mainly caused by crosstalk between OTDM tributaries FIG. 5 shows the optical intensity profile obtained by infra-red camera. Graph 502 is the intensity profile of the generated OAM mode +4. The intensity profile is in "donut" shape. Graph 504 is the intensity profile of the demultiplexed OAM mode +4. The bright point in the center corresponds to the Gaussian mode after demultiplexing.

Figure 6:
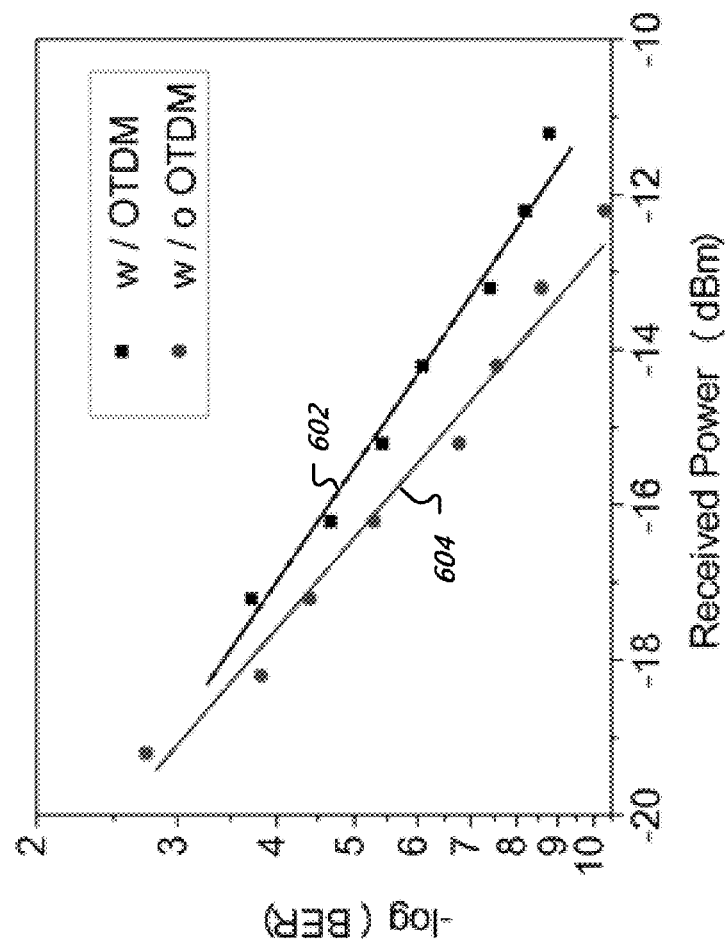
FIG. 6 shows a graphical example of BER versus received power with two example curves shown: 10 Gbps with OTDM and 5 Gbps without OTDM.
Figure 8:
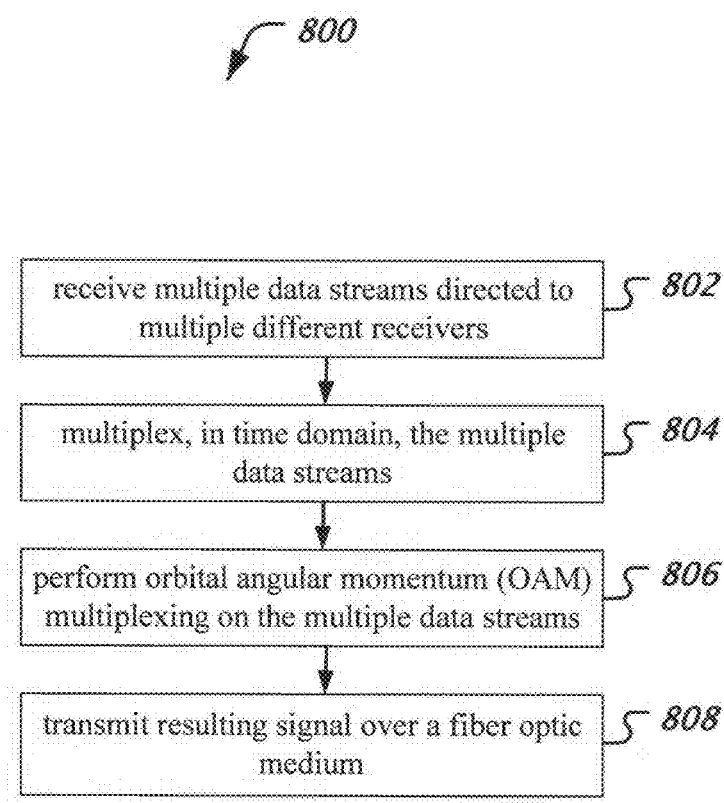
FIG. 8 shows an example method of optical communication using OAM.

BER versus the received optical power is measured and plotted in FIG. 6. The curve 604 is 5-Gbps RZ signal without OTDM and the curve 602 is 2×5-Gbps RZ signal with OTDM. The BER can be smaller than $1\times10^{-9}$ over OAM +4 whether with or without OTDM FIG. 8 shows an example of a method 800 of optical communication, implemented at a network-side equipment in an optical communication network. The method 800 may be implemented, e.g., at a network-side transmitter in an optical access system, e.g., the transmitter 102 shown in FIG. 7.

The method 800 includes, at 802, receiving multiple data streams directed to multiple receivers. In some embodiments, multiple data streams can be received over a cable fiber optic line to multiple receivers.

The method 800 includes, at 804, multiplexing, in time domain, the multiple data streams such that at least some of the multiple data streams are transmitted in different time slots. In some embodiments, the data streams are transferred appearing simultaneously as sub-channels in one communication channel, but physically take turns on the channel. The time domain is divided into several recurrent time slots of fixed length, one for each sub-channel. One time-division multiplexing frame consists of one time slot per sub-channel plus a synchronization channel and sometimes error correction channel before the synchronization.

The method 800 includes, at 806, performing, for data streams transmitted in a same time slot, orbital angular momentum (OAM) multiplexing. In some embodiments, the multiplexing in time domain and the OAM multiplexing are performed using free space optics, e.g., using collimeters as described with respect to FIG. 2. In some embodiments, other techniques, e.g., using a spiral phase plate (SPP), a mode converter, or using a Q-plate. Using SLM with a computer generated hologram is advantageous because commercial components that are already available can be used.

The method 800 includes, at 808, transmitting, signal resulting from the multiplexing in time domain and OAM multiplexing, over a fiber optic medium.

In some embodiments, the method 800 further includes multiplexing, prior to the transmitting over the fiber optic medium, the signal resulting from the multiplexing in time domain and OAM multiplexing with another signal using wavelength division multiplexing.

In some embodiments, the method 800 further includes multiplexing, prior to the transmitting over the fiber optic medium, the signal resulting from the multiplexing in time domain and OAM multiplexing with another signal using polarization division multiplexing.

In some embodiments, the multiplexing in time domain is performed first, thereby generating a given number of intermediate time division multiplexed (TDM) data streams, followed by performing the OAM multiplexing by assigning a different OAM mode to each of the given number of intermediate TDM data streams.

In some embodiments, the OAM multiplexing is performed first, followed by the multiplexing in time domain.

Figure 9:
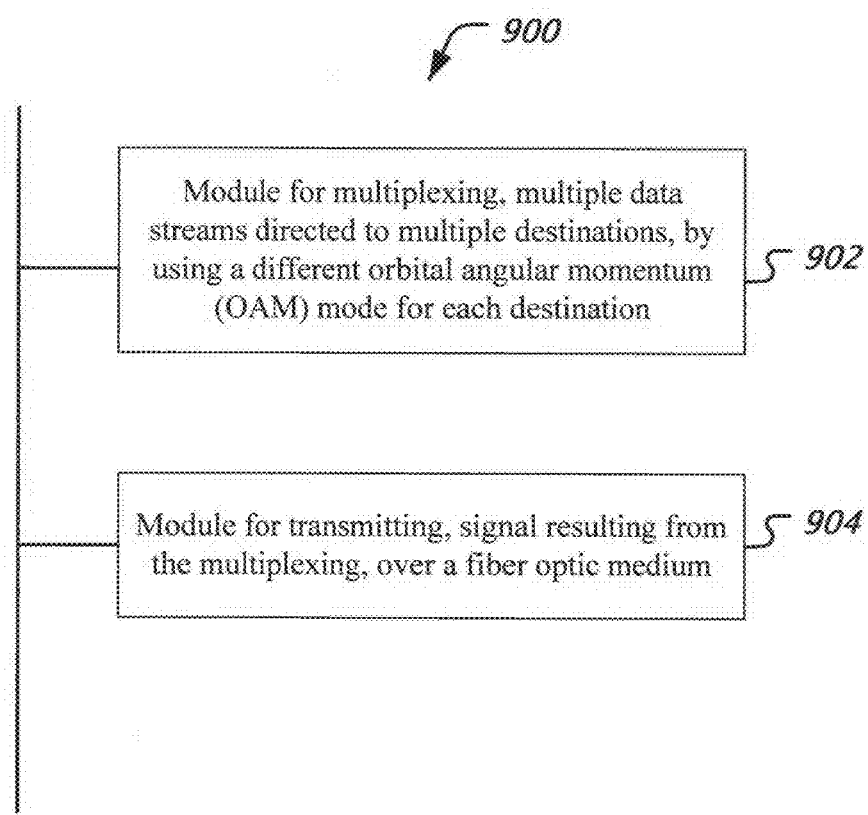
FIG. 9 shows an example block diagram of an optical communication apparatus.

FIG. 9 shows an example block diagram of an optical signal transmission apparatus 900. The apparatus 900 includes a module 902 that multiplexes, for each time slot in a time division multiplex of data, multiple data streams directed to multiple destinations, by using a different orbital angular momentum (OAM) mode for each destination.

The apparatus 900 includes a module 904 that transmits, signal resulting from the multiplexing, over a fiber optic medium. The apparatus 900, module 902 and module 904 may further be configured to implement the above-described method 800.

Figure 10:
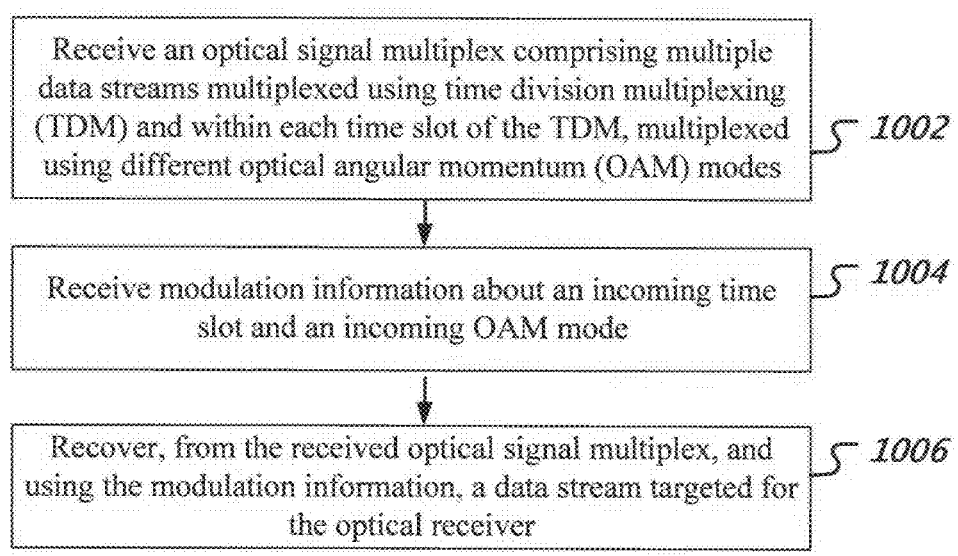
FIG. 10 shows an example method of receiving an optical signal.

FIG. 10 shows an example of a method 1000 implemented at an optical communication receiver. The receiver may be, e.g., the optical receiver described in FIG. 7.

The method 1000 includes, at 1002, receiving, over a fiber optic medium, an optical signal multiplex comprising multiple data streams multiplexed using time division multiplexing (TDM) and within each time slot of the TDM, multiplexed using different optical angular momentum (OAM) modes.

The method 1000 includes, at 1004, receiving, by the optical receiver described in FIG. 7, modulation information about an incoming time slot and an incoming OAM mode.

The method 1000 includes, at 1006, recovering, from the received optical signal multiplex, and using the modulation information, a data stream targeted for the optical receiver. Signal carried by different OAM modes will not interfere with each other due the orthogonality of OAM modes. In some embodiments, every OAM mode can be demultiplexed and detected independently by converting LG beam back to fundamental Gaussian beam while keeping other modes still in OAM mode.

In some embodiments, the method 1000 includes passing the optical signal multiplex through free space optics to extract a component of the optical signal multiplex having the incoming OAM mode. For example, in some embodiments, an LG beam with OAM mode is detected by SLM. With specific hologram pattern, the LG beam with specific OAM mode is then converted back to Gaussian beam while all other LG beam will still keep unchanged (but topological charge will change). When observing the optical intensity profile, the converted Gaussian beam will be 'bright spot' in the center while LG beam will be 'rings' around. The converted Gaussian beam can then be coupled into single mode fiber and go through photodiode for optical/electrical conversion. For receiving another OAM mode, the hologram pattern on SLM can simply be changed to "tune" to the other OAM mode.

Figure 11:
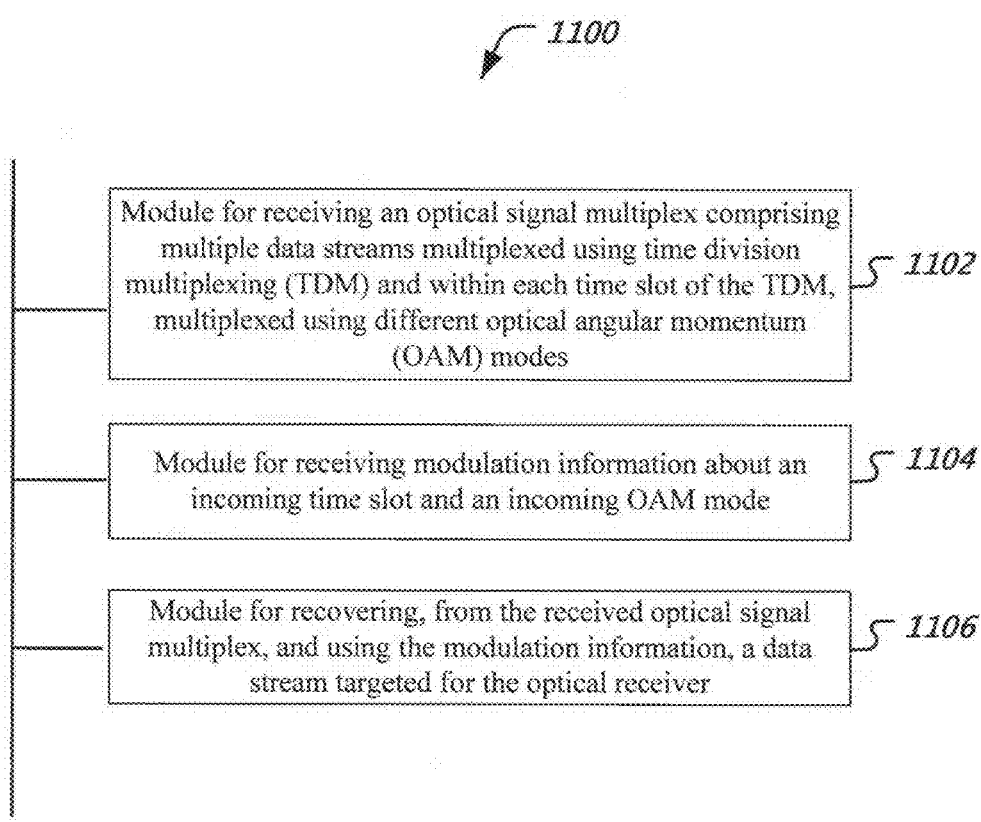
FIG. 11 shows an example block diagram of an optical receiver apparatus.

FIG. 11 shows an example of an optical receiver apparatus 1100. The apparatus 1100 includes a front end 1102 that receives an optical signal multiplex comprising multiple data streams multiplexed using time division multiplexing (TDM) and within each time slot of the TDM, multiplexed using different optical angular momentum (OAM) modes. The apparatus 1100 also includes a processor 1104 that receives modulation information about an incoming time slot and an incoming OAM mode. The apparatus 1100 includes a module 1106 that recovers, from the received optical signal multiplex, and using the modulation information, a data stream targeted for the optical receiver.

In some embodiments, an optical communication network includes an optical transmitter that creates an optical signal in which data signals directed to multiple different destinations are multiplexed in time domain and further multiplexed using different modes of optical angular momentum, and a plurality of optical receivers. Each optical receiver corresponds to a destination and receive the optical signal and extracts data signal directed to itself based on information received from the optical transmitted identified a time slot location and an optical angular momentum mode where the data signal directed to that optical receiver can be located.

It will be appreciated that we propose and demonstrate a novel time division multiplexed OAM access system to increase capacity and spectral efficiency by proof-of-concept experiment. Multiple time division multiplexed OAM modes are further multiplexed to realize two-dimensional (time dimension and OAM dimension) multiplexing. Every OAM mode can be shared with different time tributaries by more users. The capacity and spectral efficiency of access network is significantly improved. The orthogonality between OTDM and OAM techniques is also verified in our experiment. In our experiment, 2×5-Gbps RZ signal over OAM mode +4 is transmitted and investigated. The BER performance is smaller than $1\times10^{-9}$ for both 5-Gbps RZ signal without OTDM and 2×5-Gbps RZ signal with OTDM. Results show that the proposed time division multiplexed OAM access system is suitable for future broadband access network The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, implemented at a network-side equipment in an optical communication network, comprising:
    receiving multiple data streams directed to multiple receivers,
    multiplexing, in time domain, the multiple data streams such that at least some of the multiple data streams are transmitted in different time slots;
    performing, for data streams transmitted in a same time slot, orbital angular momentum (OAM) multiplexing using multiple different OAM modes, wherein the multiple different OAM modes are generated simultaneously using a hologram pattern; and
    transmitting, signal resulting from the multiplexing in time domain and OAM multiplexing, over a fiber optic medium.

2. The method of claim 1, wherein the multiplexing in time domain and the OAM multiplexing are performed using free space optics.

3. The method of claim 1, further including:
    further multiplexing, prior to the transmitting over the fiber optic medium, the signal resulting from the multiplexing in time domain and OAM multiplexing with another signal using wavelength division multiplexing.

4. The method of claim 1, further including:
    further multiplexing, prior to the transmitting over the fiber optic medium, the signal resulting from the multiplexing in time domain and OAM multiplexing with another signal using polarization division multiplexing.

5. The method of claim 1, wherein the multiplexing in time domain is performed first, thereby generating a given number of intermediate time division multiplexed (TDM) data streams, followed by performing the OAM multiplexing by assigning a different OAM mode to each of the given number of intermediate TDM data streams.

6. The method of claim 1, wherein the OAM multiplexing is performed first, followed by the multiplexing in time domain.

7. The method of claim 1, comprising obtaining the hologram pattern by:
generating a first preliminary hologram having a first OAM mode and a second preliminary hologram having a second OAM mode,
generating a first rotated hologram based on the first preliminary hologram using a first angular mask,
generating a second rotated hologram based on the second preliminary hologram using a second angular mask, and
superimposing the first rotated hologram and the second rotated hologram to obtain the hologram pattern.

8. The method of claim 2, wherein the OAM multiplexing is performed by converting optical signals carrying the multiple data streams to a Laguerre Gaussian (LG) format.

9. An optical communication apparatus, comprising:
a module configured to generate a plurality of orbital angular momentum (OAM) modes simultaneously;
an OAM multiplexer configured to multiplex, for each time slot in a time division multiplex of data, multiple data streams directed to multiple destinations, by using a different orbital angular momentum (OAM) mode for each destination selected from the plurality of OAM modes; and
a transmitter configured to transmit signal from the OAM multiplexer over a fiber optic medium.

10. The apparatus of claim 9, wherein the OAM multiplexer comprises free space optics.

11. The apparatus of claim 9, further including:
a multiplexer configured to multiplex, prior to the transmitting over the fiber optic medium by the transmitter, the signal from the OAM multiplexer with another signal using wavelength division multiplexing.

12. The apparatus of claim 9, further including:
a multiplexer configured to multiplex, prior to the transmitting over the fiber optic medium by the transmitter, the signal from the OAM multiplexer with another signal using polarization division multiplexing.

13. The apparatus of claim 9, wherein the module comprises a single light modulator, two beam splitters, and three mirrors.

14. The apparatus of claim 10, wherein the OAM multiplexer converts optical signals carrying the multiple data streams to a Laguerre Gaussian (LG) format.

15. A method of optical communication, implemented at an optical receiver, comprising:
receiving an optical signal multiplex comprising multiple data streams multiplexed using time division multiplexing (TDM) in a plurality of time slots, wherein, within each time slot of the plurality of time slots, the multiple data streams are multiplexed using different-optical angular momentum (OAM) modes, the different OAM modes generated simultaneously using a hologram pattern;
receiving modulation information about an incoming time slot and an incoming OAM mode; and
recovering, from the received optical signal multiplex, and using the modulation information, a data stream targeted for the optical receiver.

16. The method of claim 15, further including passing the optical signal multiplex through free space optics to extract a component of the optical signal multiplex having the incoming OAM mode.

17. The method of claim 15, further including passing the optical signal multiplex through free space optics to extract a component of the optical signal multiplex occupying the incoming time slot.

18. An optical receiver apparatus, comprising:
a front end that receives an optical signal multiplex comprising multiple data streams multiplexed using time division multiplexing (TDM) in a plurality of time slots, wherein, within each time slot of the plurality of time slots, the multiple data streams are multiplexed using different optical angular momentum (OAM) modes, the different OAM modes generated simultaneously using a hologram pattern;
a processor that receives modulation information about an incoming time slot and an incoming OAM mode; and
a module that recovers, from the received optical signal multiplex, and using the modulation information, a data stream targeted for the optical receiver.

19. The apparatus of claim 18, further including a module that passes the optical signal multiplex through free space optics to extract a component of the optical signal multiplex having the incoming OAM mode.

20. The apparatus of claim 18, further including a module that passes the optical signal multiplex through free space optics to extract a component of the optical signal multiplex occupying the incoming time slot.

21. An optical communication network, comprising:
an optical transmitter that creates an optical signal in which data signals directed to multiple different destinations are multiplexed in time domain and further multiplexed using different modes of optical angular momentum, wherein the different modes of optical angular momentum are generated simultaneously using a hologram pattern; and
a plurality of optical receivers, wherein each optical receiver corresponds to a destination and receive the optical signal and extracts data signal directed to itself based on information received from the optical transmitted identified a time slot location and an optical angular momentum mode where the data signal directed to that optical receiver can be located.

22. The optical communication network of claim 21, wherein the optical transmitter performs at least a portion of creation of the optical signal using free space optics and transmits the optical signal over a fiber optic transmission medium.

23. The optical communication network of claim 21, wherein the data signals are further multiplexed in polarization domain and/or are wavelength division multiplexed.

* * * * *